UNITED STATES PATENT OFFICE.

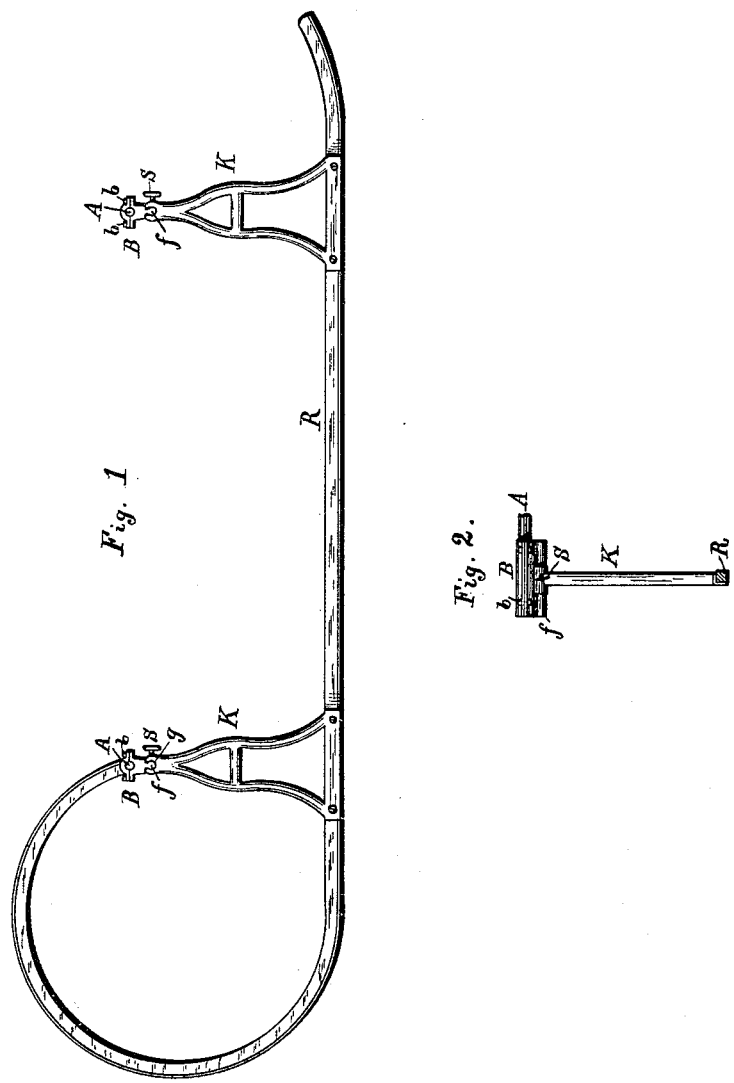

JOHN C. FREY, OF ROCHESTER, NEW YORK, ASSIGNOR OF ONE-HALF TO GEORGE A. MILLER, OF SAME PLACE.

ADJUSTABLE SLED-RUNNER.

SPECIFICATION forming part of Letters Patent No. 389,214, dated September 11, 1888.

Application filed February 26, 1887. Serial No. 228,982. (No model.) Patented in Canada January 12, 1888, No. 28,343.

*To all whom it may concern:*

Be it known that I, JOHN C. FREY, a citizen of the United States, residing in the city of Rochester, county of Monroe, and State of New York, have invented a new and useful Improvement in Adjustable Sled-Runners, (for which I have obtained a patent in Canada, No. 28,343, bearing date January 12, 1888,) of which the following is a specification.

This invention relates to that class of sled-runners which are attachable to the ends of the axles of wagons or carriages in place of the wheels, so as to transform the vehicle into a sled, my invention having particular reference to baby-carriages in which the rear and forward axles are of unequal lengths, although it also is applicable to other and full-sized carriages.

The objects of my invention are to enable those having carriages or wagons whose forward and rear axles are of unequal length to easily and quickly, and at slight expense, transform the same into sleds for winter use by attaching runners to the ends of the axles in place of the wheels, and to store the runners in a small space when not in use. I accomplish these objects by using two runners not connected with each other, and by securing upon the top of each runner two knees at the same distance from each other as the two axles to which they are to be attached, and connecting these knees with the axles by boxes fitting the ends of the axles, the boxes being attached to the knees by the sliding connections hereinafter described, both of which are adjustable sidewise of the vehicle. By means of these lateral sliding adjustments the runners may be adjusted parallel to each other when the forward and rear axles are of unequal lengths, as is frequently the case with baby-carriages, and then firmly secured in place. By using runners not connected with each other much less space is required for storing them when not in use than is required for runners fastened together in position for use.

In the annexed drawings, Figure 1 is a side view of the runner, knees, boxes, and sliding adjustment. Fig. 2 is a rear view of the same, showing how the runner and knees are adjustable laterally under the boxes, like letters referring to like parts in each figure.

R represents the runner; K K, the knees; B B, the boxes, which are made in two pieces, the upper and lower half of each box being fastened together by the small bolts *b b*, which enables the box to be fitted and secured to axles of different sizes; or, if preferred, the boxes may be made in one piece and of different sizes.

A A represent the ends of the axles protruding through the boxes, the box being retained in place upon the axle by the usual nut upon the end of the axle, which is not shown in the drawings; or, if made in two pieces, by the pressure of the two halves of the box upon the axle sustained by the two bolts *b b*, or in any other convenient manner.

T represents the top of the knee, which is made T-shaped crosswise of the runner, in the upper surface of which is the transverse groove G, in which slides the corresponding flange, F, upon the bottom of the lower half of the box, so that the box and knee may be slid or adjusted laterally in relation to each other—*i. e.*, lengthwise of the box and crosswise of the runner—the box and knee being held in the required adjustment with each other by the set-screw S. The groove in the top of the knee and the corresponding flange upon the bottom of the box may be made round or oval, or in the form of a dovetail, or in any other form, provided the knee and box are retained in connection with each other and are adjustable sidewise in relation to each other, and may be secured in the proper adjustment. So, also, the relative positions of the groove and flange may be reversed, if preferred. The knee may be cast in a single piece, and may be secured to the runner by screws, bolts, or rivets, or in any other way desired.

I am aware that a pair of runners secured to each other at a fixed distance apart by a transverse beam were used by Bird and fitted with rear boxes adjustable forward and back but not laterally, and with forward boxes adjustable laterally upon the transverse connecting-beam, and with means of adjustment entirely different from my own; but I believe myself to be the first to use a pair of runners not connected and each fitted with two boxes, both adjustable laterally upon the knees, and I also believe myself to be the first to use the groove-and-flange adjustment shown and described.

I am aware that four short runners, one in place of each wheel and "entirely independent of each other," were used by Wright, and each runner fitted with a box adjustable laterally, but by a different means from mine, and in such manner as to permit the rocking motion of the runner under the box, which is necessary with short runners, it being simply a "device" for attaching runners to the axles and "spindles of carriages," and the lateral adjustment being for the purpose of "the adjustment of the runners to any required width;" but I believe myself not only the first to use the means of adjustment herein shown, but also to be the first to use a single runner fitted with two boxes, both so adjustable laterally, the one to the right and the other to the left, that the runner may be fitted to a baby-carriage having its forward and rear axles of unequal length and the runners adjusted parallel with each other and parallel with the line of draft.

I am aware that spindle-boxes made in two parts—a base-piece and a cover or cap—are old, and such two-part boxes are not claimed by me, as the box may be made indifferently of two parts or one.

Having fully described my invention, what I desire to claim and secure by Letters Patent is—

1. In sled-runners fitted to be attached to vehicles in place of their wheels, the box B, with the longitudinal flange F upon its lower surface, and the knee K, with the groove G upon its upper end, the flange and groove fitting each other and forming a laterally-adjustable connection between the box and knee, and secured in the desired position by the set-screw S, substantially as and for the purposes shown and described.

2. The box B, provided with the longitudinal flange F, and the knee K, provided with the groove G, and set-screw S, in combination with the runner R, substantially as and for the purposes shown and described.

3. In sled-runners fitted to be attached to vehicles in place of their wheels, the box B, and knee K, provided with the laterally-adjustable groove-and-flange connection formed by the flange F and groove G, securable in the desired position by the set-screw S, substantially as and for the purposes shown and described.

4. The box B and knee K, provided with the laterally-adjustable connection formed by the flange F and groove G, securable in the desired position by the set-screw S, in combination with the runner R, substantially as and for the purposes shown and described.

5. In sled-runners fitted to be attached to vehicles in place of their wheels by boxes, which embrace the ends of the axles, and knees which connect the runner and boxes, the laterally-adjustable sliding connection between the box and knee, formed by the flange F upon the one sliding in a corresponding groove, G, in the other, and securable by the set-screw S, substantially as and for the purposes shown and described.

6. In combination with the runner R, box B, and knee K, the laterally-adjustable sliding connection between the box and knee, formed by a flange, F, upon the one sliding in a corresponding groove, G, in the other, and securable by the set-screw S, or its equivalent, substantially as and for the purposes shown and described.

7. As a new article of manufacture, a pair of sled-runners not connected with each other and each fitted to be attached in place of the two wheels to the two axles of a baby-carriage or other vehicles, having its forward and rear axles of unequal lengths by means of the two boxes B B, provided with the flange F, and the two knees K K, each provided with the groove G, forming laterally-adjustable connection, substantially as and for the purposes shown and described.

8. In combination with a pair of sled-runners not connected with each other and each fitted to be attached in place of two wheels to the two axles of a baby-carriage or other vehicle, having its forward and rear axles of unequal lengths, the boxes B B and knees K K, provided with the laterally-adjustable groove-and-flange connection formed by the flange F and groove G, securable in the desired position by the set-screw S, substantially as and for the purposes shown and described.

JOHN C. FREY.

Witnesses:
HENRY W. CONKLIN,
C. D. KIEHEL.